(12) United States Patent
Yamagishi et al.

(10) Patent No.: US 11,712,000 B2
(45) Date of Patent: Aug. 1, 2023

(54) WORK MACHINE

(71) Applicant: HONDA MOTOR CO., LTD., Tokyo (JP)

(72) Inventors: Yoshihiko Yamagishi, Wako (JP); Toru Yuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 405 days.

(21) Appl. No.: 16/763,249

(22) PCT Filed: Nov. 17, 2017

(86) PCT No.: PCT/JP2017/041512
§ 371 (c)(1),
(2) Date: May 12, 2020

(87) PCT Pub. No.: WO2019/097683
PCT Pub. Date: May 23, 2019

(65) Prior Publication Data
US 2021/0169000 A1    Jun. 10, 2021

(51) Int. Cl.
*A01D 34/78*    (2006.01)
*A01D 69/02*    (2006.01)
(Continued)

(52) U.S. Cl.
CPC .............. *A01D 34/78* (2013.01); *A01D 69/02* (2013.01); *A01D 34/006* (2013.01); *A01D 2101/00* (2013.01)

(58) Field of Classification Search
CPC ...... A01D 34/78; A01D 69/02; A01D 34/006; A01D 2101/00
See application file for complete search history.

(56) References Cited

U.S. PATENT DOCUMENTS 5,906,088 A    5/1999  Inui et al.
6,109,009 A *  8/2000  Benson .................. B60L 58/21
                                                   56/10.2 G
(Continued)

FOREIGN PATENT DOCUMENTS

JP    09-201126    8/1997
JP    2012-187026    10/2012
(Continued)

OTHER PUBLICATIONS

Extended European Search Report for European Patent Application No. 17932507.1 dated Oct. 15, 2020.
(Continued)

*Primary Examiner* — Luis A Martinez Borrero
(74) *Attorney, Agent, or Firm* — Amin, Turocy & Watson, LLP (57) ABSTRACT

A work machine (lawnmower) comprises: a main body unit having a work unit that performs a prescribed operation; and a travel motor that generates a rotational drive force that causes at least the main body unit to travel. The work machine also comprises: a travel operation unit that issues command information relating to the rotation speed of the travel motor; and a control unit that varies the rotation speed of the travel motor commanded by the travel operation unit on the basis of variation in the load on the work unit.

8 Claims, 9 Drawing Sheets

(51) Int. Cl.
   *A01D 34/00* (2006.01)
   *A01D 101/00* (2006.01)

(56) References Cited

U.S. PATENT DOCUMENTS

| | | | | |
|---|---|---|---|---|
| 7,594,377 | B1* | 9/2009 | Jansen | A01D 34/006 56/10.2 H |
| 8,572,939 | B2* | 11/2013 | Koike | B60K 7/0007 56/10.2 A |
| 8,653,786 | B2* | 2/2014 | Baetica | H01M 50/262 56/11.9 |
| 8,838,311 | B2* | 9/2014 | Koike | B60L 15/2036 701/41 |
| 8,863,485 | B2* | 10/2014 | Pitcel | B60K 6/442 56/10.2 R |
| 8,991,143 | B2* | 3/2015 | Fujiwara | F02D 29/00 56/10.2 R |
| 9,173,346 | B2* | 11/2015 | Koike | A01D 34/78 |
| 9,656,687 | B2* | 5/2017 | Koike | A01D 34/006 |
| 9,783,203 | B2* | 10/2017 | Koike | H02P 23/14 |
| 9,825,559 | B2* | 11/2017 | Wang | H02P 1/021 |
| 10,104,834 | B2* | 10/2018 | Yuki | A01D 34/78 |
| 10,111,378 | B2* | 10/2018 | Yamagishi | H01M 10/486 |
| 10,293,853 | B2* | 5/2019 | Koike | B60L 15/2036 |
| 10,709,061 | B2* | 7/2020 | Fukano | A01D 34/81 |
| 11,194,336 | B2* | 12/2021 | Uemoto | G06V 20/10 |
| 2009/0266042 | A1* | 10/2009 | Mooney | B60L 50/52 56/14.7 |
| 2010/0275564 | A1* | 11/2010 | Baetica | A01D 34/37 429/96 |
| 2012/0035815 | A1* | 2/2012 | Kawashima | B60W 10/30 903/902 |
| 2012/0227368 | A1* | 9/2012 | Koike | A01D 69/02 56/10.2 A |
| 2012/0227369 | A1* | 9/2012 | Koike | B60L 1/003 318/474 |
| 2012/0323420 | A1* | 12/2012 | Koike | B60K 7/0007 701/41 |
| 2014/0013722 | A1* | 1/2014 | Pitcel | B60W 20/20 180/65.23 |
| 2014/0059990 | A1* | 3/2014 | Fujiwara | F02D 41/2422 56/10.8 |
| 2014/0117892 | A1 | 5/2014 | Coates | |
| 2014/0137527 | A1 | 5/2014 | Motegi et al. | |
| 2015/0039171 | A1* | 2/2015 | Koike | A01D 34/006 701/22 |
| 2015/0289444 | A1* | 10/2015 | Koike | B60W 30/1886 701/50 |
| 2016/0020714 | A1* | 1/2016 | Wang | H02P 29/028 318/139 |
| 2016/0183451 | A1* | 6/2016 | Conrad | A01D 34/66 56/10.2 R |
| 2017/0217488 | A1* | 8/2017 | Koike | B62D 11/04 |
| 2017/0354087 | A1* | 12/2017 | Yamagishi | H01M 10/44 |
| 2017/0354088 | A1* | 12/2017 | Yuki | B60L 7/14 |
| 2018/0146616 | A1* | 5/2018 | Fukano | A01D 34/69 |

FOREIGN PATENT DOCUMENTS

| | | | | |
|---|---|---|---|---|
| JP | 2012187026 A | * | 10/2012 | A01D 69/02 |
| JP | 2013-017436 | | 1/2013 | |
| JP | 2013017436 A | * | 1/2013 | A01D 34/58 |

OTHER PUBLICATIONS

International Search Report and Written Opinion for International Application No. PCT/JP2017/041512 dated Feb. 6, 2018, 7 pages.
Chinese Office Action for Chinese Patent Application No. 201780096920.X dated Dec. 28, 2021.

\* cited by examiner

WORK MACHINE

TECHNICAL FIELD

The present invention relates to a work machine that travels autonomously on the work site while performing a given task on the work site.

BACKGROUND ART

Work machines such as lawn mowers, snow blowers, etc. have a driving source such as a motor etc., and perform a given task using the rotational driving force of the driving source. In this case, the load acting on the motor during the task varies according to conditions of the work site (the lawn is thick, snow is hard, etc.). Accordingly, problems such as excessive electric power consumption, nonuniform operating performance, etc. arise if the motor is set to rotate at the same speed on work sites with lighter loads and work sites with heavier loads.

For this reason, the work machine (electric lawn mower) disclosed in Japanese Laid-Open Patent Publication No. 09-201126 is configured to increase and decrease the rotational speed of the motor in accordance with the load on the motor. That is, it can achieve power saving etc. by operating at lower speeds in areas with lighter loads, and achieve superior lawn mowing performance by operating at higher speeds in areas with heavier loads.

Such a work machine can be configured to autonomously travel with a motor, and such a self-propelled machine encounters the problem of nonuniform operating performance when it travels at the same travel speed in areas with lighter loads and areas with heavier loads. Accordingly, it is preferred that the work machine operates at suitably controlled travel speeds during the given task.

SUMMARY OF INVENTION

The present invention has been devised in order to solve the problems mentioned above, and an object of the present invention is to provide a work machine that can vary travel speed suitably according to the load applied to the work machine from the work site to thereby further facilitate reduction of nonuniform operating performance and reduction of power consumption.

In order to achieve the object above, a work machine according to the present invention includes: a main body unit including a work unit configured to perform a given task; a motor configured to generate a rotational driving force for at least causing the main body unit to travel; a travel operation unit configured to provide information concerning a rotational speed of the motor; and a control unit configured to change the rotational speed of the motor indicated by the travel operation unit according to variation in a load on the work unit.

In this case, the control unit may be configured to reduce the rotational speed of the motor based on an increase in the load.

Further, preferably, the motor includes a travel motor configured to cause the main body unit to travel, and a work motor provided for the work unit and configured to provide a motive power for performing the given task; and the control unit increases the rotational speed of the work motor based on an increase in the load.

In addition to the configuration above, the control unit may be configured to change a speed status between a low-speed status for rotating the work motor at a low speed, and a high-speed status for rotating the work motor at a high speed, and the control unit may change the speed status from the low-speed status to the high-speed status based on the load exceeding a first work threshold, and change the speed status from the high-speed status to the low-speed status based on the load falling below a second work threshold that is lower than the first work threshold.

Preferably, the control unit includes a travel judgment threshold that is compared with the load when slowing down the travel motor, and the travel judgment threshold is set higher than the first work threshold.

Further, the control unit may acquire information about a present status that is divided into "rotational speed being changed" indicating that the rotational speed of the work motor is being changed to a work target rotational speed, and "constant speed rotation" indicating that the rotational speed of the work motor is substantially equal to the work target rotational speed, and the control unit may allow a speed reduction of the travel motor when recognizing the "constant speed rotation".

Here, the control unit may set a reference rotational speed based on information concerning the rotational speed of the motor, and when performing the changing of the rotational speed based on the load, the control unit may change the reference rotational speed to set a target travel rotational speed, based on a correspondence map indicating a speed ratio of the reference rotational speed that corresponds to the load.

Then, more preferably, the travel operation unit may be configured to change the reference rotational speed based on an operation performed by a user.

According to the present invention, in the work machine, the control unit varies the rotational speed of the travel motor indicated by the travel operation unit, according to variations in the load on the work unit. Thus, for example, when the load is heavy, the amount of work target processed per unit time can be reduced by slowing down the speed. As a result, the work machine can avoid a situation in which an excessive load acts on the work unit and can maintain the work in a preferable manner while preventing unexpected stall of the work unit. That is, the work machine can further facilitate reduction of nonuniform operating performance and reduction of power consumption in the given task on the work site.

DESCRIPTION OF EMBODIMENTS

The present invention will now be described in detail referring to the accompanying drawings in conjunction with preferred embodiments.

Figure 1:
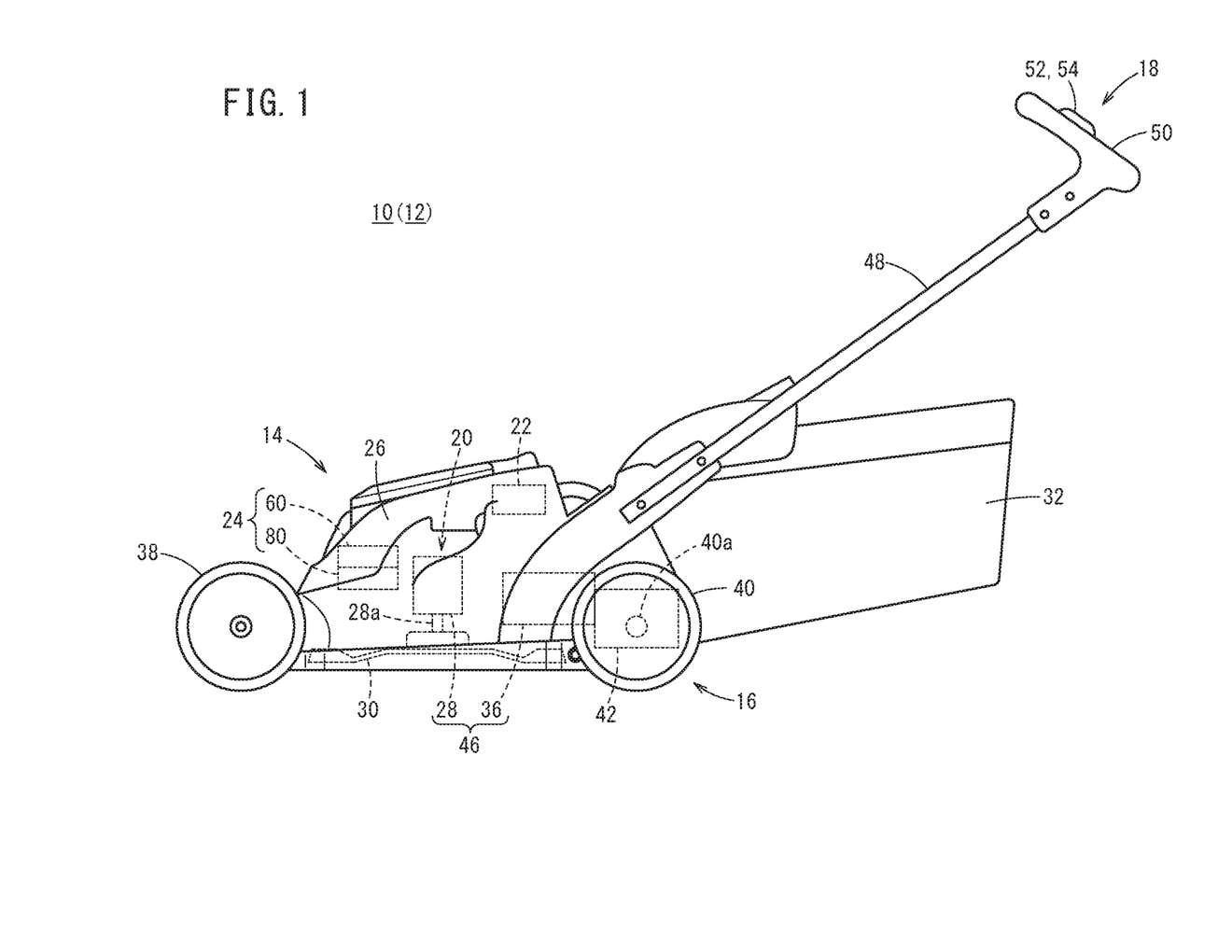
FIG. 1 is a side view illustrating the overall configuration of a lawn mower being a work machine according to an embodiment of the present invention.

As shown in FIG. 1, a work machine 10 according to one embodiment of the present invention is configured as a lawn mower 12 that cuts and collects the grass growing on a work site. Hence, the work machine 10 will hereinafter be referred to also as the lawn mower 12. The configuration of the work machine 10 according to the invention is not limited to the lawn mower 12, but can be modified suitably to be applied to work machines 10 such as grass cutters, snow blowers, cultivators, etc.

The lawn mower 12 includes a main body unit 14, a travel device 16 mounted in the main body unit 14 to cause the main body unit 14 to travel, and an operation unit 18 through which a user of the lawn mower 12 controls operations of the main body unit 14. The main body unit 14 contains therein a work unit 20 configured to directly cut grass (to perform a given task), a battery 22 capable of supplying electric power to electric components of the lawn mower 12, and a control unit 24 configured to perform control to drive the travel device 16 and the work unit 20.

The main body unit 14 further includes a disc-shaped housing 26 formed relatively thick and constituting the external appearance of the main body unit 14. In the main body unit 14, the work unit 20 is disposed in a lower position in a center of the housing 26, and the battery 22 is disposed in a higher position in the housing 26.

The work unit 20 is exposed from the bottom of the main body unit 14 to face the ground of the work site at a certain interval therefrom. The work unit 20 includes a work motor 28, a blade 30 that rotates with the rotational driving force of the work motor 28 transmitted thereto, a floating mechanism (not shown) that sucks up the grass cut by the blade 30, and a grass bag 32 for storing the grass floated by the floating mechanism.

The work motor 28 is connected to the control unit 24 through a work inverter unit 34 (see FIG. 2), and has an output shaft 28a protruding downward. The work inverter unit 34 converts the direct-current power supplied from the battery 22 into three-phase alternating current in accordance with a pulse signal of the control unit 24, so as to rotate the output shaft 28a of the work motor 28. The work inverter unit 34 varies conditions (rotational speed, torque, etc.) of the work motor 28 by suitably adjusting the phases of the three-phase alternating currents according to the pulse signal (pulse width).

The blade 30 of the work unit 20 is fixed to the output shaft 28a and extends in a direction perpendicular to the output shaft 28a (substantially parallel to the ground of the work site). The blade 30 cuts grass by rotating integrally with the output shaft 28a. The blade 30 constitutes part of the floating mechanism, and causes an air current as it rotates to suck up the cut grass. Preferably, the blade 30 is configured in such a manner that its height with respect to the work site can be adjusted.

The travel device 16 of the lawn mower 12 includes a travel motor 36, a pair of front wheels 38 and a pair of rear wheels 40 mounted on the sides of the main body unit 14 in the width direction, and a transmission mechanism unit 42 for transmitting the rotational driving force of the travel motor 36 to given wheels (the rear wheels 40 in this embodiment) to rotate the given wheels.

The travel motor 36 is disposed at the rear of the work motor 28 in the main body unit 14 and has an output shaft (not shown) projecting toward the transmission mechanism unit 42. The travel motor 36 is also connected to the control unit 24 through a travel inverter unit 44 (see FIG. 3). The travel inverter unit 44 converts the direct-current power supplied from the battery 22 into three-phase alternating current according to a pulse signal of the control unit 24, to thereby rotate the output shaft of the travel motor 36. The travel inverter unit 44 varies conditions (travel speed etc.) of the travel motor 36 by suitably adjusting the phases of the three-phase alternating currents according to the pulse signal (pulse width).

The transmission mechanism unit 42 includes gears, pulleys, belts, etc., and suitably converts the rotational driving force of the output shaft of the travel motor 36 to rotate a rear-wheel shaft 40a.

The lawn mower 12 of this embodiment includes two motors 46 (work motor 28 and travel motor 36) that generate motive power. The operation (given task) of the work unit 20 is implemented using the work motor 28 and the travel device 16 is traveled using the travel motor 36. The lawn mower 12 is not limited to this configuration but may employ a configuration in which the given task and traveling are implemented using one motor 46. In this case, a transmission mechanism (not shown) having a clutch function is preferably connected to the output shaft of the one motor 46 so that the transmission mechanism transmits rotational driving forces that have been converted to rotational speeds suitable respectively for the work unit 20 and the travel device 16.

The operation unit 18 includes: a pair of bars 48 that have their ends on one side connected to the main body unit 14, extend backward from the ends in an obliquely upward direction, and are connected together at the other ends (upper ends); and an input device 50 provided at that other end side of the bars 48 to allow the user to enter operational information. The input device 50 includes a work operation unit 52 (see FIG. 2) corresponding to the work of mowing lawns (i.e. the work unit 20) and a travel operation unit 54 (see FIG. 3) corresponding to traveling of the travel device 16.

Figure 2:
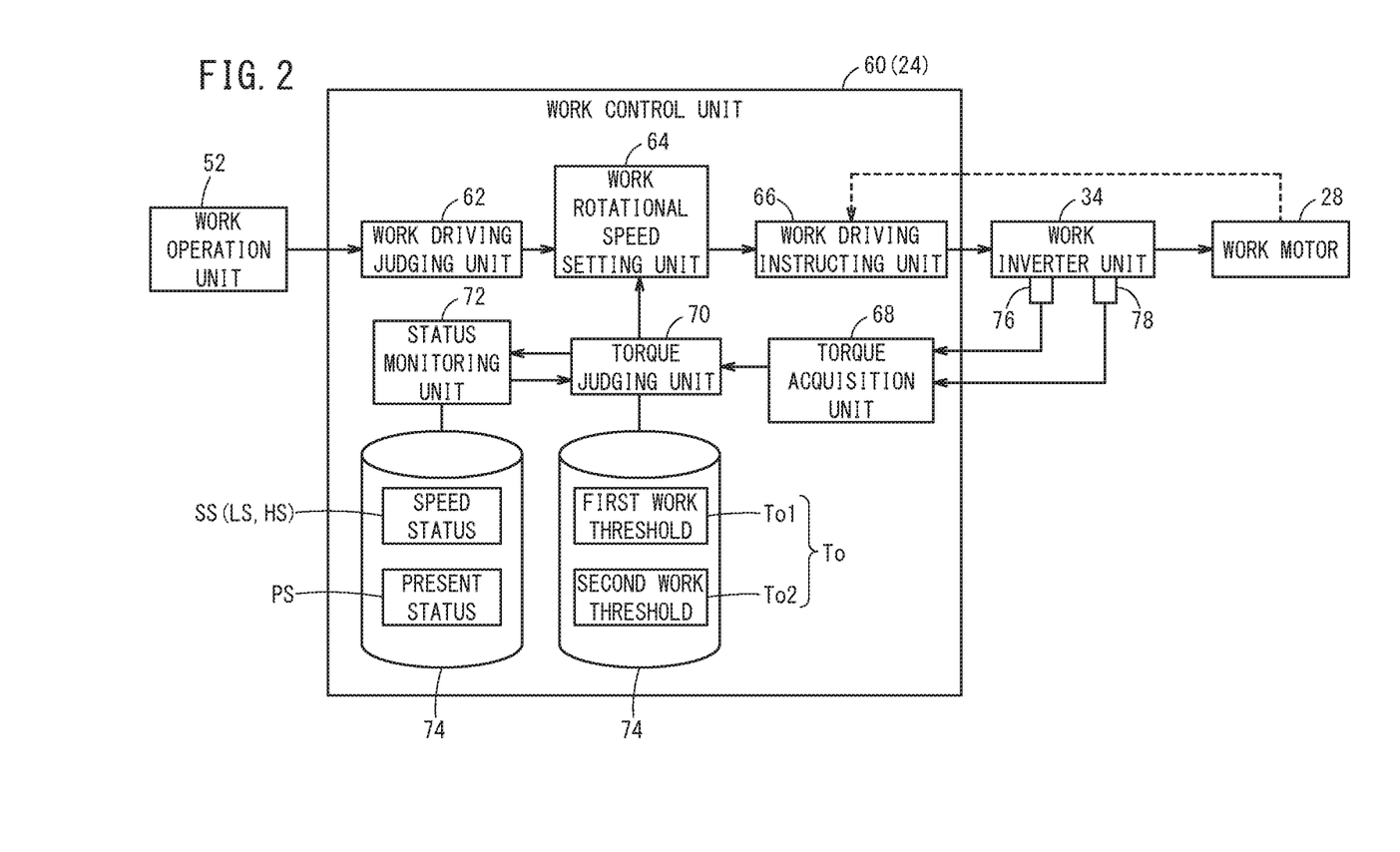
FIG. 2 is a block diagram illustrating the configuration of a work control unit of the lawn mower.

The work operation unit 52 includes a work operation switch (not shown) for switching the work unit 20 between driving and stoppage (rotation and stoppage of the work motor 28). The lawn mower 12 may be configured in such a manner that the rotational speed of the work motor 28 can be adjusted by an operation performed by the user, and the work operation unit 52 may include a work speed changing switch (not shown).

Figure 3:
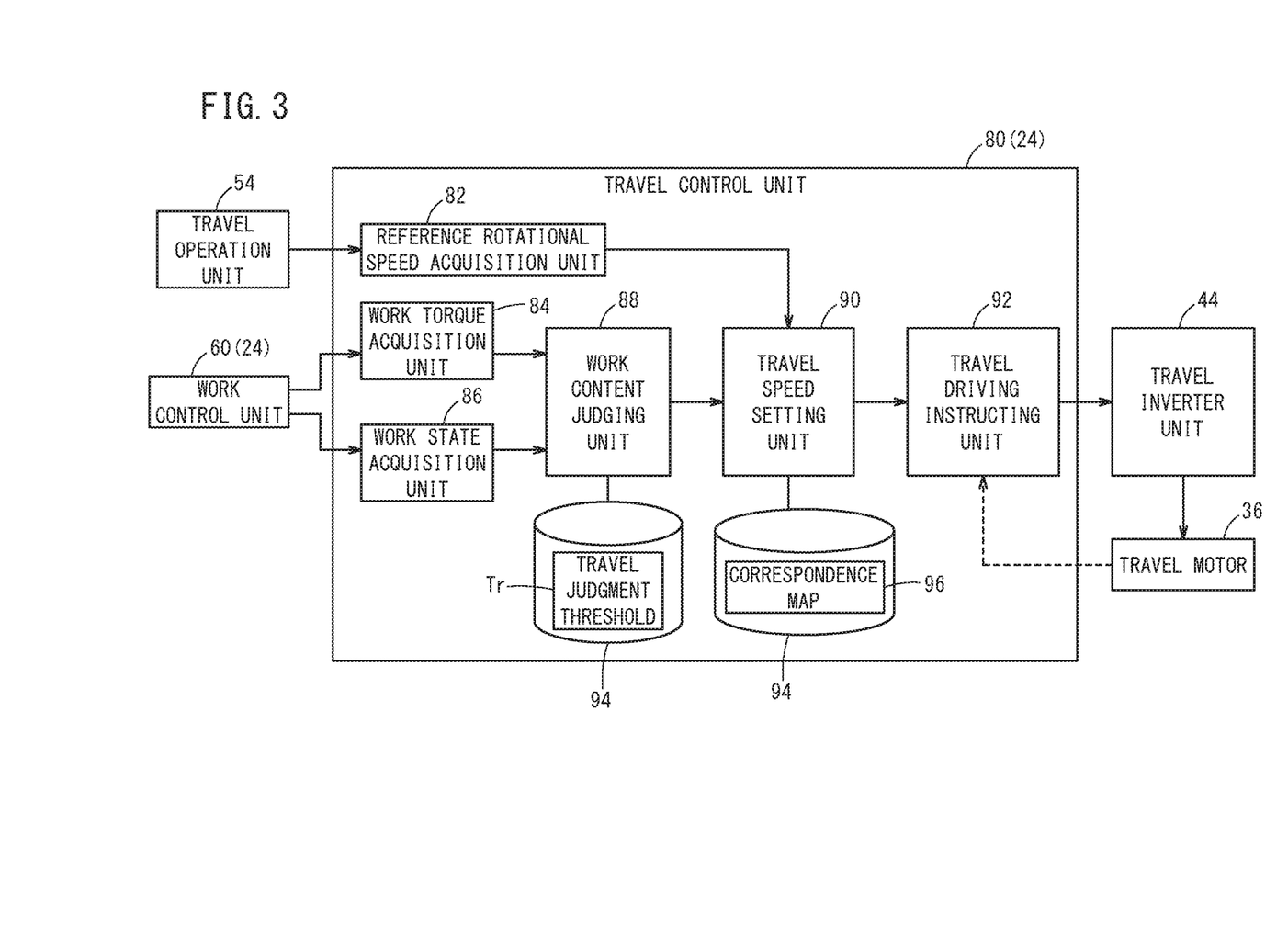
FIG. 3 is a block diagram illustrating the configuration of a travel control unit of the lawn mower.

The travel operation unit 54 includes a travel operation switch for switching between rotation and stoppage of the travel motor 36, and a speed adjusting switch for setting the travel speed of the travel device 16 (neither of which are shown). The speed adjusting switch changes the travel speed stepwise according to an operation performed by the user, like low speed, middle speed, high speed, etc., for example.

The control unit 24 is a computer having a processor, memory, input/output interface (none of which are shown), where the processor processes a program stored in the memory as the lawn mower 12 starts, and constructs functional units therein. Specifically, the control unit 24 constructs a work control unit 60 for controlling operations of the work unit 20 and a travel control unit 80 for controlling operations of the travel device 16, and thereby controls the work unit 20 and the travel device 16 in a mutually linked manner.

During operations of the work unit 20, the work control unit 60 performs a control to increase or decrease the rotational speed (the number of rotations) of the work motor 28 on the basis of the load on the blade 30 (i.e. on the work motor 28) applied from the lawn being the target of work. For example, when the load on the work motor 28 is light, it suppresses power consumption of the battery 22 by reducing the rotational speed of the work motor 28. On the other hand, when the load on the work motor 28 is heavy, it increases the amount of lawn processed (work target) by increasing the rotational speed of the work motor 28. The work control unit 60 thus enables the work unit 20 to operate with improved energy efficiency.

For this purpose, as shown in FIG. 2, the work control unit 60 includes therein a work driving judging unit 62, a work rotational speed setting unit 64, a work driving instructing unit 66, a torque acquisition unit 68, a torque judging unit 70, and a status monitoring unit 72, and operates as the work operation switch is turned on. The work control unit 60 constructs a work storage area 74 in the memory of the control unit 24, and various information used during operations of the work unit 20 is stored in the work storage area 74.

The work driving judging unit 62 obtains, from the work operation unit 52, a signal indicating whether the work operation switch is on or off according to an operation by the user, and determines to drive or stop the work motor 28. In the case of on, the work driving judging unit 62 reads a default rotational speed (not shown) of the work motor 28 that is stored in the work storage area 74 and provides it to the work rotational speed setting unit 64. When the work operation unit 52 is configured to adjust the speed, the work driving judging unit 62 reads a suitable default rotational speed based on a signal indicating the speed, from among multiple default rotational speeds stored in the work storage area 74.

The work rotational speed setting unit 64 is a functional unit configured to set a work target rotational speed, which is the target value of the rotational speed of the work motor 28, and output the work target rotational speed to the work driving instructing unit 66. For example, at the time of start, the work rotational speed setting unit 64 sets, as the work target rotational speed, the default rotational speed provided from the work driving judging unit 62. After the start, the work rotational speed setting unit 64 sets a work target rotational speed stored in the work storage area 74.

That is, the work rotational speed setting unit 64 changes the work target rotational speed on the basis of the result of determination made by the torque judging unit 70 described later, and stores the changed work target rotational speed in the work storage area 74. The operation of changing the work target rotational speed will be described later in detail.

The work driving instructing unit 66 functions as a driver that gives driving instructions (outputs a pulse signal) to the work inverter unit 34. Further, in this embodiment, the work driving instructing unit 66 also performs a feedback control with respect to the work motor 28 so as to control the rotational driving in accordance with the work target rotational speed. That is, the work driving instructing unit 66 outputs, to the work inverter unit 34, a driving instruction based on the work target rotational speed, and also detects the actual rotational speed of the work motor 28. The work driving instructing unit 66 then determines whether the actual rotational speed and the work target rotational speed agree or disagree, and performs control so that the actual rotational speed comes close to the work target rotational speed.

Now, as has been mentioned earlier, the work site where grass grows exerts different loads on the work motor 28 depending on various factors such as the density of grass, degree of growth, conditions of the work site, etc. Accordingly, the lawn mower 12 of this embodiment is configured to change the target rotational speed of the work unit 20 on the basis of the load. That is, when a lighter load acts on the work motor 28 (when resistance from the lawn etc. is smaller), the lawn mower 12 stably rotates the work motor 28 according to the work target rotational speed. On the other hand, when a heavier load acts on the work motor 28 (when resistance from the lawn etc. is larger), then it is hard to follow the work target rotational speed and so the lawn mower 12 performs a process of increasing the work target rotational speed itself to enhance the working capacity of the work unit 20.

Specifically, the lawn mower 12 includes an ammeter 76 and a voltmeter 78 for detecting the electric power (dc current and dc voltage) supplied from the battery 22 to the work inverter unit 34. The ammeter 76 and the voltmeter 78 respectively output, to the work control unit 60, a current value and a voltage value detected when the work motor 28 is driven. Then, the torque acquisition unit 68 of the work control unit 60 receives the current value and the voltage value from the ammeter 76 and the voltmeter 78 and calculates the torque (i.e. load) acting on the work motor 28 according to a given calculation method. Since the torque on the work motor 28 is substantially linked to the current value, the torque acquisition unit 68 may be configured to acquire only the current value to calculate the torque.

Then, based on the torque acquired by the torque acquisition unit 68, the torque judging unit 70 of the work control unit 60 determines whether to change the rotational speed of the work motor 28. The torque judging unit 70 reads a work threshold To previously stored in the work storage area 74 and compares the acquired torque and the work threshold To.

In this embodiment, when the load is light, the work control unit 60 (work rotational speed setting unit 64) sets a low-speed rotation to operate the work motor 28 at a low target rotational speed, and when the load is heavy, it sets a high-speed rotation to operate the work motor 28 at a high target rotational speed. That is, the state of the speed of the work motor 28 includes two states: a low-speed status LS and a high-speed status HS.

Also, the work threshold To includes a first work threshold To1 for determining whether to increase the target rotational speed when the work motor 28 is in the low-speed status LS, and a second work threshold To2 for determining whether to decrease the target rotational speed when the work motor 28 is in the high-speed status HS. That is, when the work motor 28 is at a low speed, the torque judging unit 70 makes a determination using the first work threshold To1 between a first pattern in which the work motor 28 is kept at the low-speed rotation and a second pattern in which the work motor 28 is brought to the high-speed rotation. On the other hand, when the work motor 28 is at a high speed, the torque judging unit 70 makes a determination using the second work threshold To2 between a third pattern in which the work motor 28 is kept at the high-speed rotation and a fourth pattern in which the work motor 28 is brought to the low-speed rotation.

For this purpose, the work control unit 60 includes the status monitoring unit 72 configured to monitor the present speed state of the work motor 28. The status monitoring unit 72 stores the low-speed status LS and high-speed status HS indicating the present speed state (speed status SS) in the work storage area 74, and reads and sends the speed status SS to the torque judging unit 70 when judging the torque. Then, the torque judging unit 70 suitably reads the first or second work threshold To1, To2 and compares the threshold with the acquired torque.

The torque judging unit 70 outputs, to the work rotational speed setting unit 64, the result of determination from among the first to fourth patterns. On the basis of the result of determination from among the first to fourth patterns, the work rotational speed setting unit 64 maintains or changes (increases or decreases) the work target rotational speed of the work motor 28. That is, in the case of the first pattern, the work rotational speed setting unit 64 does not change the work target rotational speed (maintains low-speed state). In the case of the second pattern, the work rotational speed setting unit 64 increases the work target rotational speed (changes from low-speed state to high-speed state). In the case of the third pattern, the work rotational speed setting unit 64 does not change the work target rotational speed (maintains high-speed state). In the case of the fourth pattern, the work rotational speed setting unit 64 decreases the work target rotational speed (changes from high-speed state to low-speed state).

Returning to FIG. 1, the travel control unit 80 of the lawn mower 12 performs a control to increase or decrease the travel speed of the main body unit 14 (the rotational speed of the travel motor 36) that is realized by the travel device 16, on the basis of the load acting on the work motor 28 during the operation of the work unit 20. For example, when the load on the work motor 28 is light, the travel speed of the travel device 16 is kept at a reference speed (reference rotational speed), whereby the work unit 20 is moved so as to efficiently cut the lawn on the work site. On the other hand, when the load on the work motor 28 is heavy, the travel speed of the travel device 16 is lowered below the reference rotational speed, thus slowing down the movement of the work unit 20 to reduce the amount of lawn processed per unit time. In particular, the lawn mower 12 of this embodiment maintains or increases/decreases the reference rotational speed specified by the user in such a manner that the reference rotational speed is also liked to the rotational speed of the work motor 28.

For this purpose, as shown in FIG. 3, the travel control unit 80 includes therein a reference rotational speed acquisition unit 82, a work torque acquisition unit 84, a work state acquisition unit 86, a work content judging unit 88, a travel speed setting unit 90, and a travel driving instructing unit 92, and operates as the travel operation switch is turned on. The travel control unit 80 constructs a travel storage area 94 in the memory of the control unit 24, and various information used during operations of the travel device 16 is stored in the travel storage area 94.

The reference rotational speed acquisition unit 82 acquires, from the travel operation unit 54, information about the reference rotational speed of the travel motor 36 that has been set by the user. As mentioned earlier, the travel device 16 can set the travel speed at multiple levels (e.g., low-speed travel, middle-speed travel, high-speed travel) as the user operates the speed adjusting switch. Hence, upon receiving information about the speed level from the travel operation unit 54, the reference rotational speed acquisition unit 82 refers to a speed reference map (not shown) held in the travel storage area 94, extracts a rotational speed of the travel motor 36 associated with the speed level, and acquires the extracted rotational speed as the reference rotational speed.

The work torque acquisition unit 84 acquires the torque (load) on the work motor 28 from the work control unit 60. As explained earlier, the work control unit 60 calculates the torque acting on the work motor 28 during operation and sends the information about the torque to the travel control unit 80 in response to a request from the work torque acquisition unit 84.

Further, the work state acquisition unit 86 acquires a present status PS of the work motor 28 from the work control unit 60. The present status PS differs from the speed status SS (low-speed status LS, high-speed status HS) that is information indicating the target of the speed of the work motor 28, and the present status PS is information indicating the operation that the work motor 28 is performing when the information is sent to the work state acquisition unit 86.

Figure 4:
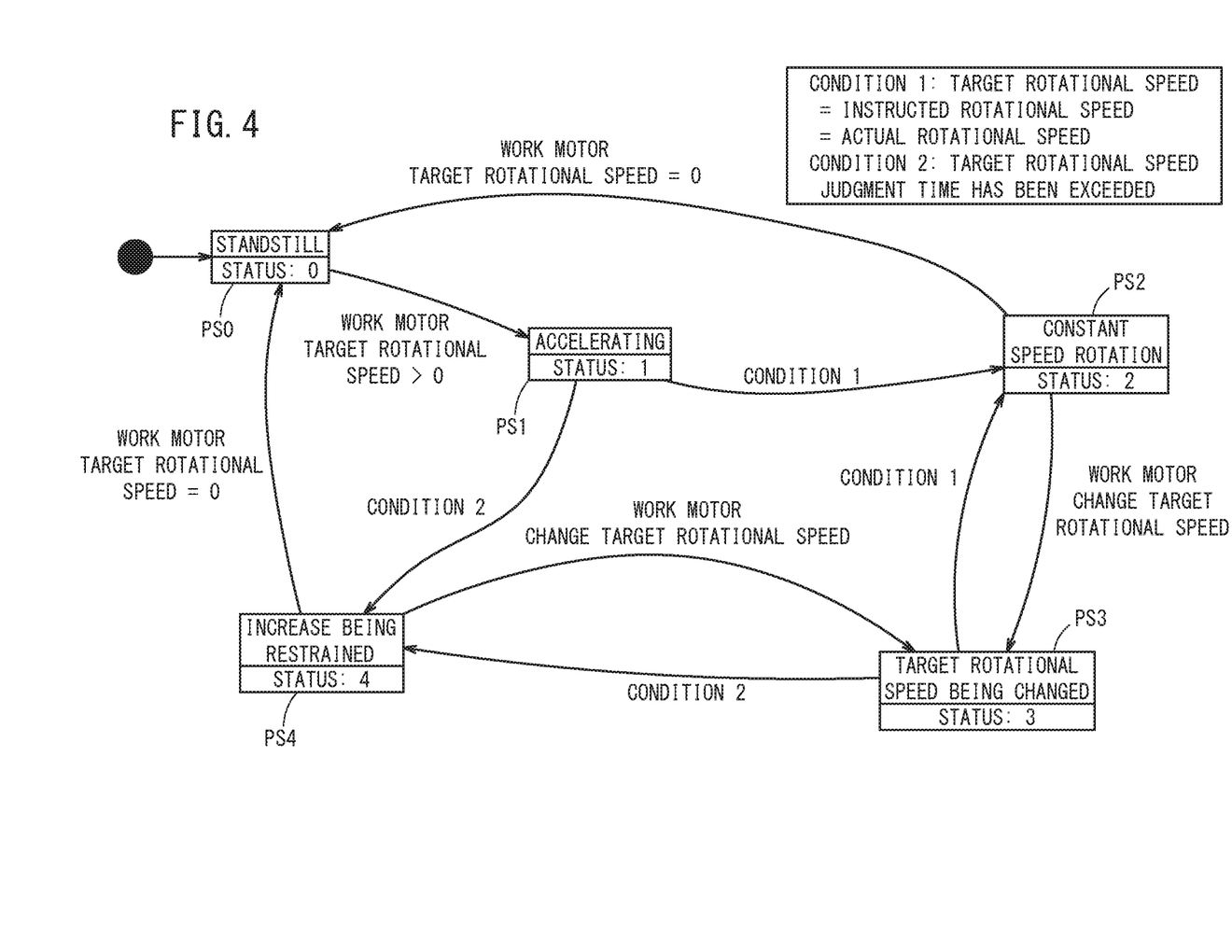
FIG. 4 is a state transition diagram illustrating transitions of a present status of the work unit.

As shown in FIG. 4, for example, the present status PS includes "accelerating" indicating that the rotation of the work motor 28 is being accelerated toward the work target rotational speed (default rotational speed) as the work motor 28 at a standstill is started. The present status PS further includes "constant speed rotation" indicating that the work motor 28 has reached the work target rotational speed and the speed is kept constant (feedback control only is being performed). The present status PS further includes "target rotational speed being changed" indicating that the work target rotational speed has been changed from the constant speed rotation and the speed of the work motor 28 is being increased or decreased. In addition, this embodiment is configured to limit situations where a rapid increase in the rotational speed continues for a certain time period during acceleration of the work motor 28, in order to suppress power consumption of the battery 22. Accordingly, the present status PS further includes "increase being restrained" indicating that the increase in the rotational speed is being restrained.

That is, the present status PS includes a status PS0 indicating "standstill", a status PS1 indicating "accelerating", a status PS2 indicating "constant speed rotation", a status PS3 indicating "target rotational speed being changed", and a status PS4 indicating "increase being restrained". The present status varies from PS0 to PS1 when the work motor 28 is started and the rotational speed is raised toward the target rotational speed. The present status varies from PS1 to PS2 when the target rotational speed of the work motor 28, an instructed rotational speed given to the work inverter unit 34, and the actual rotational speed of the work motor 28 are equal (when condition 1 holds). The present status varies from PS2 to PS3 when the target rotational speed of the work motor 28 is changed. On the other hand, the present status varies from PS3 to PS2 when the condition 1 above holds.

Also, the work control unit 60 includes a timer (not shown) for measuring the time during which the rotational speed of the work motor 28 is being raised. The present status varies from PS1 to PS4 when the measured time has exceeded a rotational speed judgment time (when condition 2 holds). The present status varies from PS4 to PS3 when the target rotational speed of the work motor 28 is changed. On the other hand, the present status varies from PS3 to PS4 when the condition 2 holds. When the work motor 28 is stopped, the work control unit 60 sets the target rotational speed of the work motor 28 to zero, and the present status varies from PS2 or PS4 to PS0.

While the work motor 28 is being driven, the work control unit 60 (status monitoring unit 72) shown in FIG. 2 monitors the present status PS, as well as the speed status SS. Then, with suitable timing, the work control unit 60 sends the monitored information (present status PS) to the work state acquisition unit 86 of the travel control unit 80.

That is, when the lawn mower 12 changes the travel speed according to the load on the work motor 28, changing the speed while the rotational speed of the work motor 28 is being changed will cause the operation to vary violently. For example, when the work motor 28 is set at higher speed to cut a sufficient amount of lawn, slowing down the travel speed will immediately reduce the load, causing the work motor 28 to return to lower speed and the travel speed of the travel device 16 to go back to the previous speed, which will increase the load again (the same operation may be repeated). Accordingly, the operation of changing the travel speed is not performed while the target rotational speed of the work motor 28 is being changed (during acceleration, during deceleration: during "target rotational speed being changed"), but is performed while the rotational speed of the work motor 28 is stable. As a result, when the load on the work motor 28 is heavy, the control unit 24 can deal with the heavy load by bringing the work motor 28 to the high-speed status HS, and then reduce the travel speed of the travel device 16 if the load still remains heavy thereafter.

The work content judging unit 88 of the travel control unit 80 is a functional unit that judges the states of the work unit 20 described above. On the basis of the present status PS acquired by the work state acquisition unit 86, the work content judging unit 88 first judges whether it is the right time to change the speed of the travel device 16. That is, the work content judging unit 88 determines it is not the right time to change the travel speed when the present status PS is PS0, PS1, PS3, and allows change of the travel speed when the present status PS is PS2, PS4.

Then, when the present status PS is PS2, PS4, the work content judging unit 88 reads a travel judgment threshold Tr stored in the travel storage area 94 and compares the acquired torque and the travel judgment threshold Tr. The travel judgment threshold Tr has a higher value than the work threshold To (first work threshold To1). Hence, when the load on the work motor 28 is heavy, a process of bringing the work motor 28 to the high-speed status HS can be performed in light- and middle-load regions, and further, a process of slowing down the travel motor 36 can be performed in a heavy-load region.

Then, when the torque on the work motor 28 is lower than the travel judgment threshold Tr, the work content judging unit 88 outputs, to the travel speed setting unit 90, an instruction to maintain the travel speed. On the other hand, if the torque on the work motor 28 is higher than the travel judgment threshold Tr, then the work content judging unit 88 outputs, to the travel speed setting unit 90, an instruction to reduce the torque on the work motor 28 and the travel speed.

Basically (in the absence of the instruction to reduce the travel speed from the work content judging unit 88), the travel speed setting unit 90 sets, as the travel target rotational speed of the travel motor 36, the reference rotational speed of the travel motor 36 acquired by the reference rotational speed acquisition unit 82. When the instruction to reduce the travel speed is issued from the work content judging unit 88, the travel speed setting unit 90 then reads a correspondence map 96 previously stored in the travel storage area 94 and performs a process of reducing the reference rotational speed on the basis of the correspondence map 96.

Figure 5:
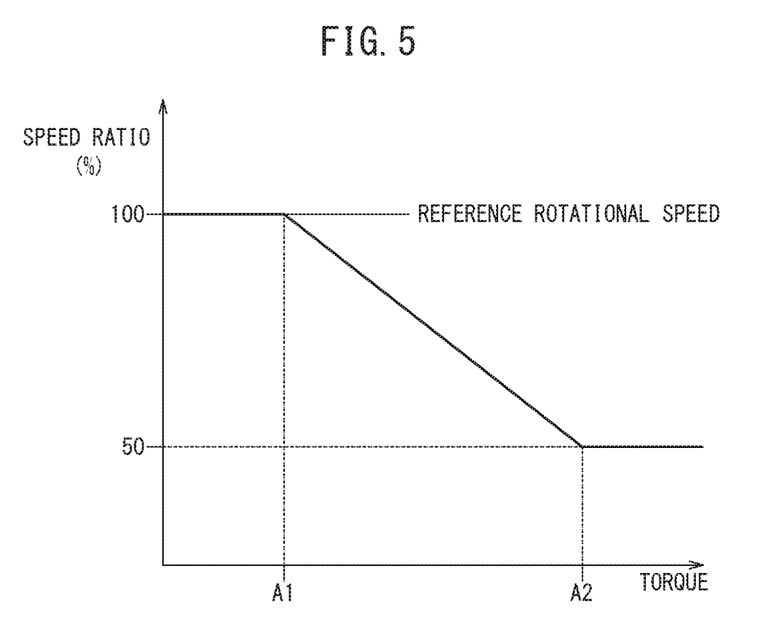
FIG. 5 is a graph showing an example of a correspondence map of the travel control unit.

As shown in FIG. 5, the correspondence map 96 can be represented as a graph in which the torque on the work motor 28 and a speed ratio of the travel motor 36 are associated with each other, for example. That is, when the torque is below or at a first value A1 in the correspondence map 96, the travel target rotational speed is set to 100% (kept at the reference rotational speed). When the torque is in the range from the first value A1 to a second value A2 in the correspondence map 96, the travel target rotational speed is set by linearly reducing the reference rotational speed at a reduction ratio of from 100% to 50%. When the torque is larger than the second value A2, the reference rotational speed lowered to 50% is set as the travel target rotational speed.

Having set the travel target rotational speed based on the reference rotational speed and correspondence map 96, the travel speed setting unit 90 outputs the setting data to the travel driving instructing unit 92. The travel driving instructing unit 92 functions as a driver that gives a driving instruction (outputs a pulse signal) to the travel inverter unit 44. Further, in this embodiment, the travel driving instructing unit 92 performs a feedback control with respect to the travel motor 36 so as to control the rotational driving in accordance with the travel target rotational speed. That is, the travel driving instructing unit 92 detects the actual rotational speed of the travel motor 36, in addition to outputting the driving instruction based on the travel target rotational speed to the travel inverter unit 44. Then whether the actual rotational speed and the travel target rotational speed agree or disagree is determined, and control is performed so that the actual rotational speed comes close to the travel target rotational speed (so that they agree with each other substantially).

The lawn mower 12 (work machine 10) of this embodiment is basically constructed as described above. Next, operations thereof will be described.

When the user starts the work machine 10, the work machine 10 performs the given task by causing the work unit 20 to generate a rotational driving force, and autonomously travels on the work site by the travel device 16. In the work unit 20, the work motor 28 operates rotationally in a suitable manner under the control of the work control unit 60, thereby cutting and collecting the grass on the work site.

Figure 6:
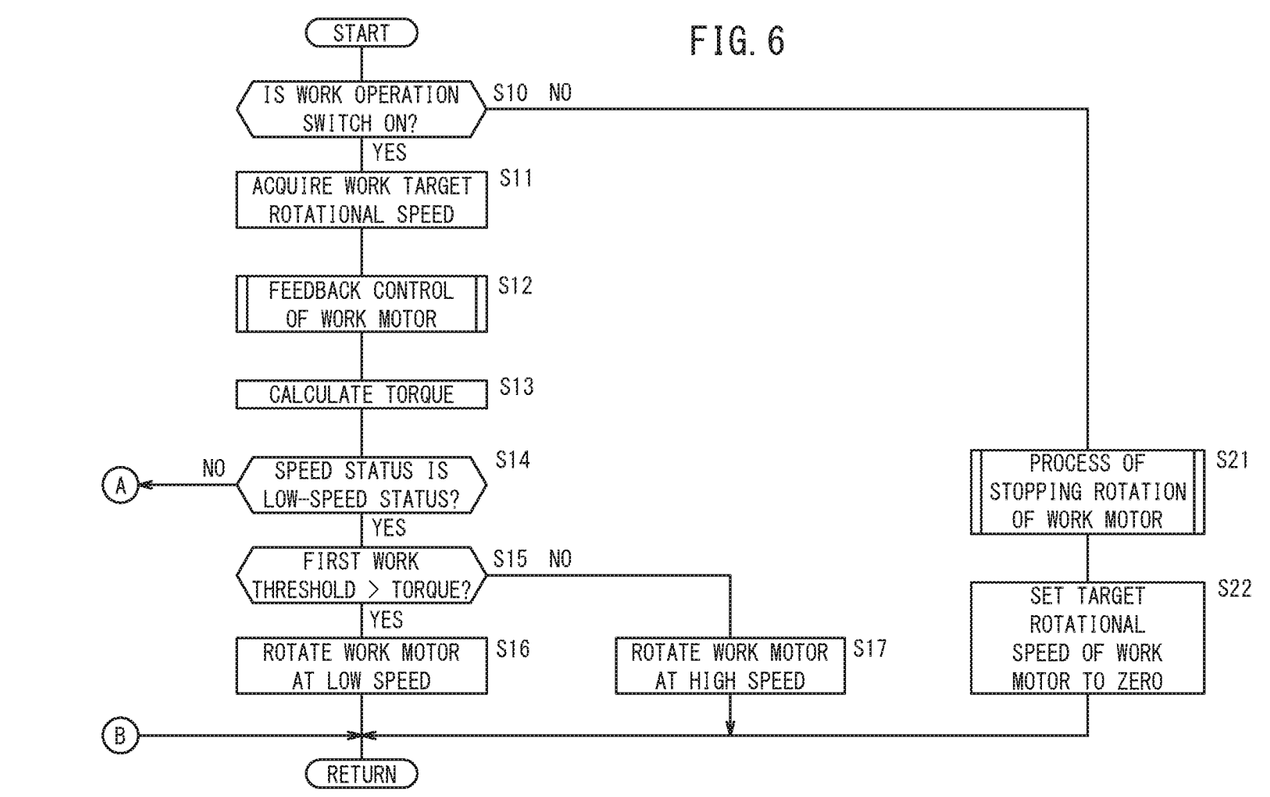
FIG. 6 is a first flowchart illustrating a control process performed when a work motor is driven.

As shown in FIG. 6, when the control unit 24 starts, the work driving judging unit 62 of the work control unit 60 determines whether the work operation switch is on (step S10). Then, if the work operation switch is on (step S10: YES), the work rotational speed setting unit 64 of the work control unit 60 performs a process of acquiring the work target rotational speed of the work motor 28 (step S11).

In the process of acquiring the target rotational speed, if it is at the start of the work motor 28, a default rotational speed previously stored in the work storage area 74 is set as the target rotational speed. On the other hand, in the course of operation of the work motor 28, the target rotational speed (information of the speed status SS) that was set last time is read from the work storage area 74 and set as the target rotational speed.

The work driving instructing unit 66 performs the feedback control to cause the actual rotational speed of the work motor 28 to follow the work target rotational speed set by the work rotational speed setting unit 64 (step S12). Then, while the work motor 28 is driven, the torque acquisition unit 68 of the work control unit 60 acquires the current value and the voltage value of the work motor 28 and calculates the torque (step S13). The calculated torque is output to the torque judging unit 70.

Further, the status monitoring unit 72 of the work control unit 60 monitors the low-speed status LS or high-speed status HS of the work motor 28 while the work motor 28 is driven, and provides the torque judging unit 70 with information of the speed status SS to which the work motor 28 is set at present. The torque judging unit 70 judges the speed status SS (step S14) and reads one of the first and second work thresholds To1, To2.

That is, when the speed status SS is judged as the low-speed status LS (step S14: YES), the torque judging unit 70 reads out the first work threshold To1 and compares the first work threshold To1 with the torque (step S15). Then, if the first work threshold To1 is larger than the torque (step S15: YES), the torque judging unit 70 chooses to keep the low-speed status LS of the work motor 28, and the work rotational speed setting unit 64 stores the present work target rotational speed (low-speed status LS) in the work storage area 74 (step S16). Accordingly, in step S11 in the next processing flow, the work control unit 60 reads this work target rotational speed.

On the other hand, when the first work threshold To1 is equal to or smaller than the torque (step S15: NO), it chooses to change from the low-speed status LS to high-speed status HS, and the work rotational speed setting unit 64 stores the work target rotational speed of the high-speed status HS in the work storage area 74 (step S17). Accordingly, in step S11 in the next processing flow, the work control unit 60 reads the work target rotational speed that has been changed to the high-speed status HS.

Figure 7:
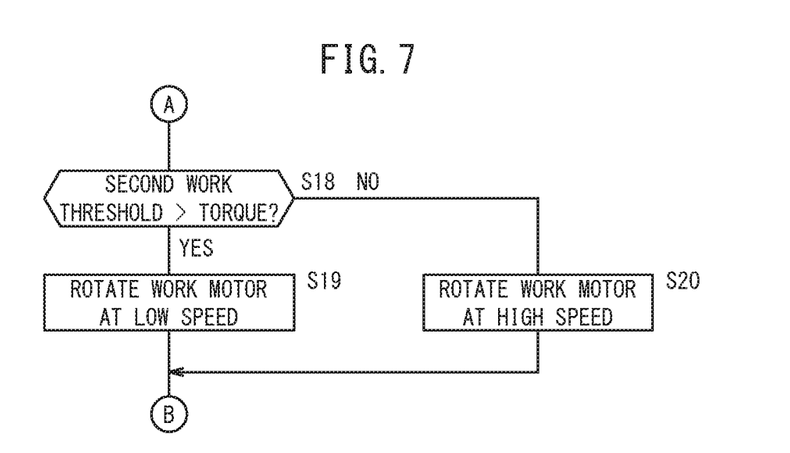
FIG. 7 is a second flowchart illustrating the control process performed when the work motor is driven.

Meanwhile, as shown in FIG. 7, when the torque judging unit 70 judges the speed status SS as the high-speed status HS (step S14: NO), it reads out the second work threshold To2 and compares the second work threshold To2 with the torque (step S18). Then, if the second work threshold To2 is larger than the torque (step S18: YES), the torque judging unit 70 chooses to change from the high-speed status HS to low-speed status LS, and the work rotational speed setting unit 64 stores the work target rotational speed of the low-speed status LS in the work storage area 74 (step S19).

On the other hand, when the second work threshold To2 is equal to or smaller than the torque (step S18: NO), the torque judging unit 70 chooses to keep the high-speed status HS of the work motor 28, and the work rotational speed setting unit 64 stores the present work target rotational speed (high-speed status HS) in the work storage area 74 (step S20).

Then, returning to FIG. 6, after the processes of steps S16, S17, S19, S20, the work control unit 60 returns to start and repeats the same processing thereafter.

When the work operation switch is not on or switched from on to off (step S10: No), the work control unit 60 chooses a process of stopping the rotation of the work motor 28 (step S21). In the rotation stopping process, the work rotational speed setting unit 64 changes the target rotational speed of the work motor 28 to zero, whereby the work driving instructing unit 66 stops the rotation of the work motor 28 (step S22). Accordingly, after the processing of step S22, the process returns to start as in the cases of after steps S16, S17, S19, S20, but the setting of "target rotational speed=0" is maintained unless the work operation switch is on. That is, the work control unit 60 can stop the rotational driving of the work unit 20.

Figure 8:
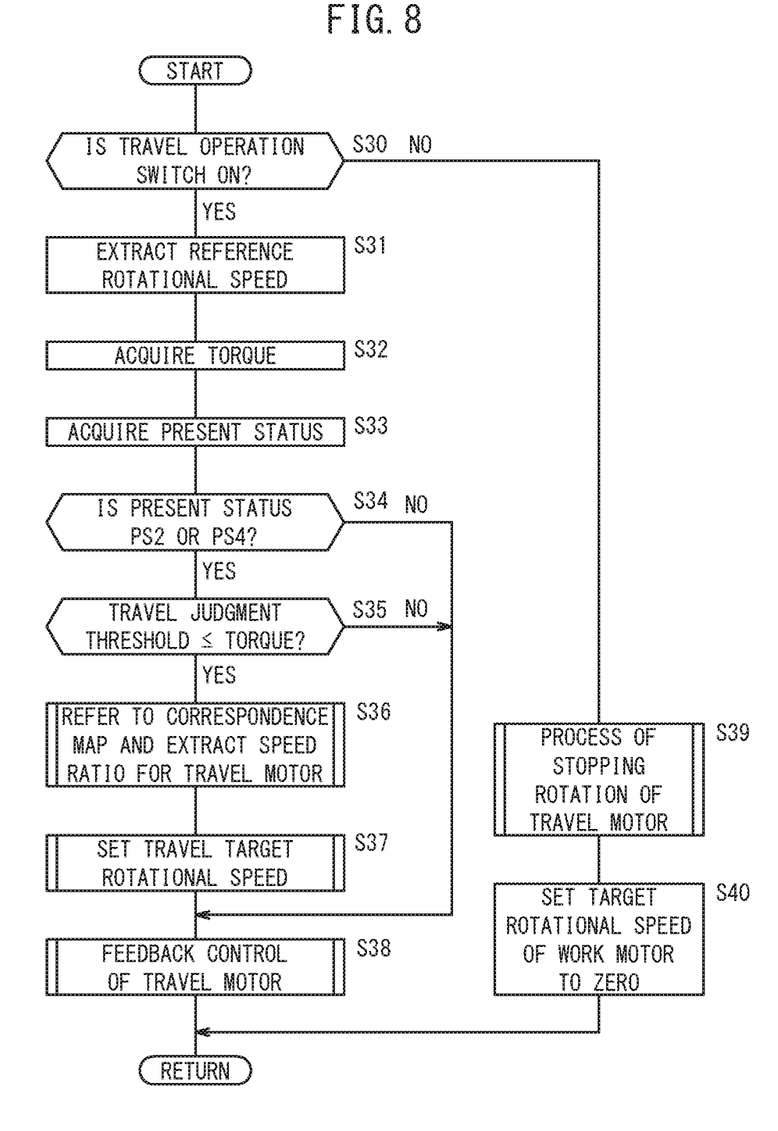
FIG. 8 is a flowchart illustrating a control process performed when a travel motor is driven.

Further, the travel device 16 rotationally drives the travel motor 36 in a suitable manner under the control of the travel control unit 80, so as to move the main body unit 14. As shown in FIG. 8, when the control unit 24 starts, the travel control unit 80 determines whether the travel operation switch is on (step S30).

If the travel operation switch is on (step S30: YES), the reference rotational speed acquisition unit 82 of the travel control unit 80 extracts a reference rotational speed on the basis of the speed that the user has set from the speed adjusting switch (step S31). Also, the work torque acquisition unit 84 acquires the torque from the work control unit 60 (step S32), and the work state acquisition unit 86 acquires the present status PS from the work control unit 60 (step S33).

Then, the work content judging unit 88 judges whether or not the acquired present status PS is status PS2 or PS4 (step S34). If the present status PS is status PS2 or PS4 (step S34: YES), the process moves to step S35. If the present status PS is status PS0, PS1, or PS3 (step S34: NO), the process moves to step S38 skipping steps S35 to S37.

At step S35, the work content judging unit 88 reads the travel judgment threshold Tr from the travel storage area 94 and compares the threshold with the acquired torque. That is, the work content judging unit 88 judges whether or not the torque is equal to or larger than the travel judgment threshold Tr. If the torque is equal to or larger than the travel judgment threshold Tr, the process moves to step S36. If the torque is smaller than the travel judgment threshold Tr, the process moves to step S38 skipping steps S36, S37.

At step S36, the travel speed setting unit 90 reads the correspondence map 96 from the travel storage area 94 and extracts the speed ratio of the reference rotational speed on the basis of the correspondence map 96 and the torque. The travel speed setting unit 90 then multiplies the reference rotational speed by the extracted speed ratio to set the travel target rotational speed of the travel motor 36 (step S37).

Then, the travel driving instructing unit 92 performs the feedback control to cause the actual rotational speed of the travel motor 36 to follow the travel target rotational speed set by the travel speed setting unit 90 (step S38). After step S38, the process returns to start and the same processing is repeated thereafter.

When the travel operation switch is not on or is switched from on to off (step S30: No), the travel control unit 80 chooses a process of stopping the rotation of the travel motor 36 (step S39). In the rotation stopping process, the travel speed setting unit 90 changes the travel target rotational speed of the travel motor 36 to zero, whereby the travel driving instructing unit 92 stops the rotation of the work motor 28 (step S40). Accordingly, as in step S38, the process returns to start after the processing of step S40, but the setting of "travel target rotational speed=0" is maintained unless the travel operation switch is on. That is, the travel control unit 80 can stop the travel of the travel device 16.

Figure 9:
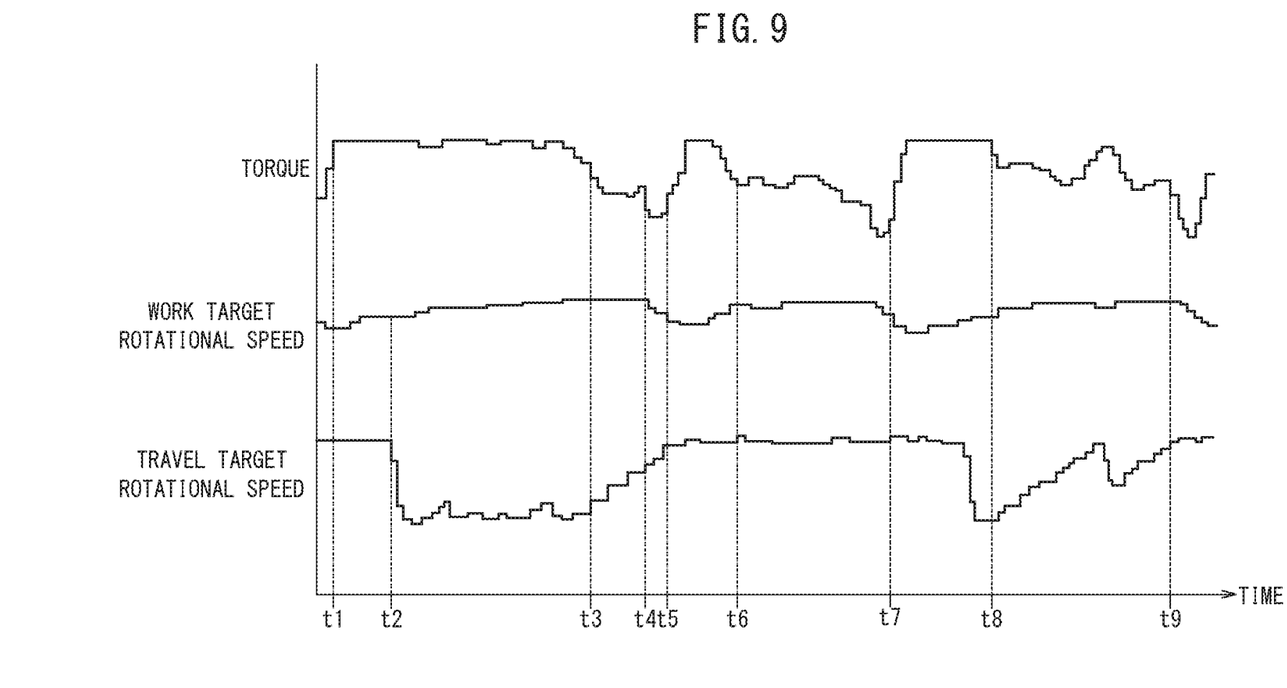
FIG. 9 is a time chart showing a simulation of variations in work target rotational speed and travel target rotational speed based on variation in load.

Through the processes above, the lawn mower 12 can suitably deal with the load applied to the work motor 28 from the work site through the operations of both the work unit 20 and the travel device 16. A simulation based on the processing flow above was performed on the target rotational speed of the work motor 28 and the target rotational speed of the travel motor 36 with varying load. FIG. 9 shows the results.

In FIG. 9, the horizontal axis shows time and the waveforms on the vertical axis show the torque on the work motor 28, the work target rotational speed of the work motor 28, and the travel target rotational speed of the travel motor 36 in this order. When a high torque acts on the work motor 28 before time t1, the work target rotational speed of the work motor 28 starts rising (moves to the high-speed status HS).

At time t2 at which the increase in speed of the work motor 28 is once restrained (the "increase being retrained" in FIG. 4: status PS4), the travel target rotational speed of the travel motor 36 decreases.

Then, when the torque starts falling at time t3, the travel motor 36 increases the travel target rotational speed of the travel motor 36 in response to the variation in the torque. Further, when the torque falls below the second work threshold To2 at time t4, the work target rotational speed of the work motor 28 also falls (moves to the low-speed status LS). From time t5 to time t6, when the torque rises only for a short period, the work target rotational speed of the work motor 28 rises but the speed of the travel motor 36 is not reduced. This is because the torque will decrease while the work target rotational speed of the work motor 28 is rising.

At time t7, when the torque rises again and keeps rising for a certain period, the work target rotational speed rises and the travel target rotational speed decreases. Further, from time t8 to t9, when the torque varies up and down without falling to the second work threshold To2, the travel target rotational speed varies following the torque, with the work target rotational speed remaining approximately constant.

As described so far, according to the work machine 10 (lawn mower 12) of this embodiment, the control unit 24 varies the rotational speed (reference rotational speed) of the travel motor 36 (motor 46) indicated by the travel operation unit 54, according to variations in the load (torque) on the work unit 20. Thus, for example, when the load is heavy, the amount of lawn, which is the target of work, processed per unit time can be reduced by slowing down the speed. As a result, the lawn mower 12 can avoid a situation in which an excessive load acts on the work motor 28 (clogging with grass etc.) and can maintain the work in a preferable manner while preventing unexpected stall of the work motor 28. That is, the lawn mower 12 can further facilitate reduction of nonuniform operating performance and reduction of power consumption in the operation of mowing lawn on the work site.

In particular, the control unit 24 reduces the rotational speed of the travel motor 36 (motor 46) in response to increasing load. This allows the work unit 20 to travel slower and so more reliably perform the work in a smaller work area.

In this case, the lawn mower 12 having the separate work motor 28 and travel motor 36 can control the individual motors more finely. Then, with the configuration in which the rotational speed of the work motor 28 is increased in response to increasing load, the control unit 24 can increase the amount of lawn processed per unit time when the load is heavy, enabling the work motor 28 to operate under more energy efficient conditions.

Furthermore, the control unit 24 changes the speed status from the low-speed status LS to high-speed status HS on the basis of the first work threshold To1, and changes the speed status from the high-speed status HS to low-speed status LS on the basis of the second work threshold To2 that is lower than the first work threshold To1. This allows the lawn mower 12 to maintain the low-speed status LS and high-speed status HS even when the load varies to some degree.

Furthermore, since the travel judgment threshold Tr is higher than the first work threshold To1, the lawn mower 12 can first deal with the load by rotating the work motor 28 at high speed, and then slow down the main body unit 14 if the load still remains heavy, to thereby reduce the load on the work unit 20. This allows the lawn mower 12 to perform the work more efficiently.

Moreover, by acquiring the present status PS of the work motor 28 and then slowing down the travel motor 36 during constant speed rotation, the control unit 24 can implement the transition of the work motor 28 to the high-speed status HS and the speed reduction of the travel motor 36 at different points of time. This prevents unstable operations of the work motor 28 and the travel motor 36 that would be caused by variations in the load.

Further, the control unit 24 can keep the work unit 20 working without considerably reducing the amount of processing of the work unit 20, by setting the reference rotational speed to a target travel rotational speed that is suitable for the load by referring to the correspondence map 96.

Furthermore, since the lawn mower 12 can vary the reference rotational speed on the basis of an operation performed by the user, the lawn can be suitably mowed according to the user's taste and requirements. Moreover, since the target travel rotational speed varies automatically depending on the load, the lawn mower 12 can operate suitably even in places with heavy loads without leaving the lawn unmown, for example.

The present invention is not limited to the embodiment described above and can be modified in various manners according to the essence and gist of the present invention.

What is claim is:

1. A work machine comprising:
   a main body unit including a blade configured to perform a given task;
   a travel motor configured to generate a rotational driving force for causing the main body unit to travel;
   a work motor provided for the blade and configured to provide a motive power for performing the given task;
   a switch configured to provide information concerning a rotational speed of the travel motor; and
   a control unit configured to drive the work motor based on a predetermined work target rotational speed and change the rotational speed of the travel motor indicated by the switch according to variation in the electrical power load drawn by the work motor determined based on measured values of current and voltage of the work motor during the given task, wherein the control unit increases the work target rotational speed as the electrical power load increases.

2. The work machine according to claim 1, wherein the control unit reduces the rotational speed of the travel motor based on an increase in the electrical power load.

3. The work machine according to claim 1, wherein the control unit increases a rotational speed of the work motor based on an increase in the electrical power load.

4. The work machine according to claim 3, wherein
   the control unit is configured to change a speed status between a low-speed status for rotating the work motor at a low speed, and a high-speed status for rotating the work motor at a high speed, and
   the control unit changes the speed status from the low-speed status to the high-speed status based on the electrical power load exceeding a first threshold, and changes the speed status from the high-speed status to the low-speed status based on the electrical power load falling below a second threshold that is lower than the first work threshold.

5. The work machine according to claim 4, wherein the control unit includes a travel judgment threshold that is compared with the electrical power load when slowing down the travel motor, and
   the travel judgment threshold is set higher than the first work threshold.

6. The work machine according to claim 3, wherein the control unit acquires information about a present status that is divided into "rotational speed being changed" indicating that the rotational speed of the work motor is being changed to a work target rotational speed, and "constant speed rotation" indicating that the rotational speed of the work motor is kept at the work target rotational speed, and the control unit allows a speed reduction of the travel motor when recognizing the "constant speed rotation".

7. The work machine according to claim 1, wherein the control unit sets a reference rotational speed based on information concerning the rotational speed of the travel motor, and when performing the changing of the rotational speed based on the electrical power load, the control unit changes the reference rotational speed to set a target travel rotational speed, based on a correspondence map indicating a speed ratio of the reference rotational speed that corresponds to the electrical power load.

8. The work machine according to claim 7, wherein the switch is configured to change the reference rotational speed based on an operation performed by a user.

* * * * *

UNITED STATES PATENT AND TRADEMARK OFFICE
CERTIFICATE OF CORRECTION

PATENT NO.       : 11,712,000 B2
APPLICATION NO.  : 16/763249
DATED            : August 1, 2023
INVENTOR(S)      : Yamagishi et al.

Page 1 of 1

It is certified that error appears in the above-identified patent and that said Letters Patent is hereby corrected as shown below:

In the Claims

At Line 33, in Column 14, in Claim 1:
It should read "a switch configured to provide a rotational speed of the travel motor; and".

Signed and Sealed this
Eighth Day of October, 2024

Katherine Kelly Vidal
*Director of the United States Patent and Trademark Office*